US011268439B2

(12) United States Patent
Saruta et al.

(10) Patent No.: US 11,268,439 B2
(45) Date of Patent: Mar. 8, 2022

(54) COLD-HEAT POWER GENERATION DEVICE

(71) Applicant: KOBE STEEL, LTD., Hyogo (JP)

(72) Inventors: Hiroki Saruta, Takasago (JP); Masaki Matsukuma, Takasago (JP); Takashi Sato, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/957,341

(22) PCT Filed: Dec. 12, 2018

(86) PCT No.: PCT/JP2018/045679
§ 371 (c)(1),
(2) Date: Jun. 23, 2020

(87) PCT Pub. No.: WO2019/138766
PCT Pub. Date: Jul. 18, 2019

(65) Prior Publication Data
US 2020/0332709 A1 Oct. 22, 2020

(30) Foreign Application Priority Data
Jan. 12, 2018 (JP) .............................. JP2018-003189

(51) Int. Cl.
*F02C 6/16* (2006.01)
*F02C 1/04* (2006.01)
(Continued)

(52) U.S. Cl.
CPC .................. *F02C 6/16* (2013.01); *F02C 1/04* (2013.01); *F01D 15/10* (2013.01); *F02C 7/143* (2013.01);
(Continued)

(58) Field of Classification Search
CPC .... F02C 6/16; F02C 1/04; F02C 7/143; F01D 15/10; F05D 2220/60
(Continued)

(56) References Cited
U.S. PATENT DOCUMENTS 5,161,365 A * 11/1992 Wright ...................... F02C 7/32
60/780
5,461,882 A * 10/1995 Zywiak .............. B60H 1/00007
62/401
(Continued)

FOREIGN PATENT DOCUMENTS

JP     S58-107806 A    6/1983
JP     S63-230914 A    9/1988
(Continued)

OTHER PUBLICATIONS

JP-03054327-A English Translation (Year: 1991).*
(Continued)

*Primary Examiner* — Shafiq Mian
(74) *Attorney, Agent, or Firm* — Studebaker & Brackett PC

(57) ABSTRACT

A cold-heat power generation device includes a thermal power generation device, a CAES power generation device, and an output merging part. A facility includes an LNG vaporizer, a motive power part that burns natural gas vaporized by the LNG vaporizer to convert the natural gas into motive power, and a primary generator that is driven by the motive power part. A facility includes an air compressor that compresses air cooled by the LNG vaporizer, an air tank that stores compressed air discharged from the air compressor, air heaters that heat the compressed air supplied from the air tank with heat generated when the natural gas is burned in the motive power part, an air expander that expands the compressed air heated by the air heaters, and a secondary generator that is driven by the air expander. At the output (Continued)

merging part, output of the primary generator and output of the secondary generator are merged with each other.

4 Claims, 5 Drawing Sheets

(51) Int. Cl.
*F01D 15/10* (2006.01)
*F02C 7/143* (2006.01)

(52) U.S. Cl.
CPC ...... *F05D 2220/60* (2013.01); *F05D 2220/76* (2013.01); *F05D 2260/42* (2013.01)

(58) Field of Classification Search
USPC .............................................. 60/39.182, 727
See application file for complete search history.

(56) References Cited

U.S. PATENT DOCUMENTS

| | | | |
|---|---|---|---|
| 6,167,692 B1* | 1/2001 | Anand | F02C 1/00 |
| | | | 60/39.12 |
| 2001/0004830 A1* | 6/2001 | Wakana | F25J 1/0012 |
| | | | 60/39.182 |
| 2005/0028529 A1* | 2/2005 | Bartlett | B01D 53/1475 |
| | | | 60/772 |
| 2011/0233940 A1* | 9/2011 | Aoyama | F01K 23/10 |
| | | | 290/1 R |

FOREIGN PATENT DOCUMENTS

| | | | |
|---|---|---|---|
| JP | H03-054327 A | | 3/1991 |
| JP | H04-127850 A | | 4/1992 |
| JP | 03054327 A | * | 12/1998 |
| JP | 2014-125987 A | | 7/2014 |
| JP | 2014125987 A | * | 7/2014 |
| JP | 2016-211465 A | | 12/2016 |

OTHER PUBLICATIONS

JP-2014125987-A English Translation (Year: 2014).*
International Preliminary Report On Patentability and Written Opinion issued in PCT/JP2018/045679; dated Jul. 23, 2020.

* cited by examiner

COLD-HEAT POWER GENERATION DEVICE

CROSS-REFERENCE TO RELATED APPLICATIONS

This is a national phase application in the United States of International Patent Application No. PCT/JP2018/045679 with an international filing date of Dec. 12, 2018, which claims priority of Japanese Patent Application No. 2018-003189 filed on Jan. 12, 2018 the contents of which are incorporated herein by reference.

TECHNICAL FIELD

The present invention relates to a cold-heat power generation device.

BACKGROUND ART

JP S58-107806 A and JP S63-230914 A disclose a cold-heat power generation device that uses cold generated when liquefied natural gas (LNG) is vaporized with heat generated by a gas turbine.

JP H04-127850 A discloses a liquid air storage power generation system in which liquid air produced by using cold generated when LNG is vaporized is stored in a tank, and the liquid air in the tank is vaporized as needed to produce motive power for power generation.

SUMMARY OF THE INVENTION

The cold-heat power generation devices disclosed in Patent Documents 1, 2 generate power by using the cold generated when LNG is vaporized, and therefore cannot generate power unless LNG is vaporized. Further, the amount of power generated by such a cold-heat power generation device is determined based on the amount of LNG vaporized, so that it is difficult to regulate the amount of power generated in a timely manner. Therefore, it is not possible to make the amount of power generated to quickly respond to variations in the amount of demand power. That is, it is not possible to secure, in a timely manner, the amount of power generated adequate to the amount of demand power.

The liquid air storage power generation system disclosed in Patent Document 3 can generate power even when LNG is not vaporized, but consumes energy for liquefying air, which makes power generation efficiency of the entire system low. Further, since power is generated with a gas turbine, the amount of power generated frequently varies, which may make control unstable. Therefore, as with this system, it is not possible to make the amount of power generated to quickly respond to variations in the amount of demand power.

It is therefore an object of the present invention to provide a cold-heat power generation device capable of increasing power generation efficiency and causing the amount of power generated to quickly respond to the amount of demand power.

The present invention provides a cold-heat power generation device including a thermal power generation device, a compressed air energy storage power generation device, and an output merging part,
wherein the thermal power generation device includes:
an LNG vaporizer that vaporizes liquefied natural gas;
a motive power part that burns natural gas vaporized by the LNG vaporizer to convert the natural gas into motive power; and
a primary generator that is driven by the motive power produced by the motive power part,
wherein the compressed air energy storage power generation device includes:
an air compressor that compresses air cooled by cold generated when the liquefied natural gas is vaporized by the LNG vaporizer;
an air tank that stores compressed air discharged from the air compressor;
an air heater that heats the compressed air supplied from the air tank with heat generated when the natural gas is burned in the motive power part;
an air expander that expands the compressed air heated by the air heater; and
a secondary generator that is driven by the air expander, and
wherein output of the primary generator and output of the secondary generator are merged with each other at the output merging part.

Since this configuration causes the LNG vaporizer to cool air using cold generated when the LNG is vaporized and supply the cooled air to the air compressor, it is possible to increase the density of the compressed air and thereby increase the compression efficiency of the air compressor. Further, since the compressed air is heated by the air heater with heat generated when the natural gas is burned, and the compressed air thus heated is expanded by the air expander, it is possible to increase the expansion efficiency of the air expander, that is, to increase the power generation efficiency of the secondary generator. Further, since a large amount of stable power output of the primary generator of the thermal power generation device and highly responsive power output of the secondary generator of the compressed air energy storage (CAES) power generation device can be merged with each other at the output merging part, it is possible to produce a larger amount of stable power output and highly responsive power output. Furthermore, making the power output of the secondary generator variable allows the amount of power generated to quickly respond to the amount of demand power, which eliminates the need of making the power output of the primary generator variable. Therefore, the primary generator can continuously generate power at the maximum output, so that it is possible to increase power generation efficiency.

The compressed air energy storage power generation device may further include:
a first heat exchanger that transfers heat between the compressed air discharged from the air compressor and a heating medium to heat the heating medium;
a high-temperature heating medium tank that stores the heating medium heated by the first heat exchanger; and
a second heat exchanger that transfers heat between the heating medium stored in the high-temperature heating medium tank and the compressed air supplied from the air tank to the air expander to heat the compressed air.

This configuration allows the temperature of the compressed air stored in the air tank to be reduced by the first heat exchanger and preferably allows the temperature of the compressed r to be substantially regulated to room temperature. This makes it possible to reduce the amount of heat radiated, to the atmosphere, from the compressed air stored in the air tank, so that it is possible to increase the energy efficiency of the cold-heat power generation device. Further, the high-temperature heating medium heated by the first heat exchanger can be stored in the high-temperature heating medium tank, the high-temperature heating medium in the high-temperature heating medium tank can be supplied to the second heat exchanger as needed to heat the compressed air in the second heat exchanger, and the compressed air thus heated can be supplied to the air expander, so that it is possible to increase the expansion efficiency of the air expander.

The compressed air energy storage power generation device may further include:

an air cooler that cools the compressed air by cold generated when the liquefied natural gas is vaporized;

an air liquefier that expands the compressed air cooled by the air cooler to liquefy the compressed air;

a liquid air tank that stores liquid air liquefied by the air liquefier; and an air vaporizer that vaporizes the liquid air stored in the liquid air tank and supplies the air vaporized to the air expander.

This configuration causes air to be liquified, so that it is possible to store a large amount of air in the liquid air tank. This allows air to be supplied to the air expander for a long time and thereby allows the secondary generator to generate power for a long time. Therefore, the output of the primary generator can be supplemented for a long time. Further, in the air cooler, cooling air, before the air is liquefied, using cold generated when the LNG is vaporized makes it possible to reduce energy required for liquefying the air.

According to the present invention, the output of the thermal power generation device and the output of the compressed air energy storage power generation device are merged with each other in the cold-heat power generation device, so that it is possible to increase the power generation efficiency and cause the amount of power generated to quickly respond to the amount of demand power.

MODE FOR CARRYING OUT THE INVENTION

Hereinafter, a description will be given of embodiments of the present invention with reference to the accompanying drawings.

First Embodiment

Figure 1:
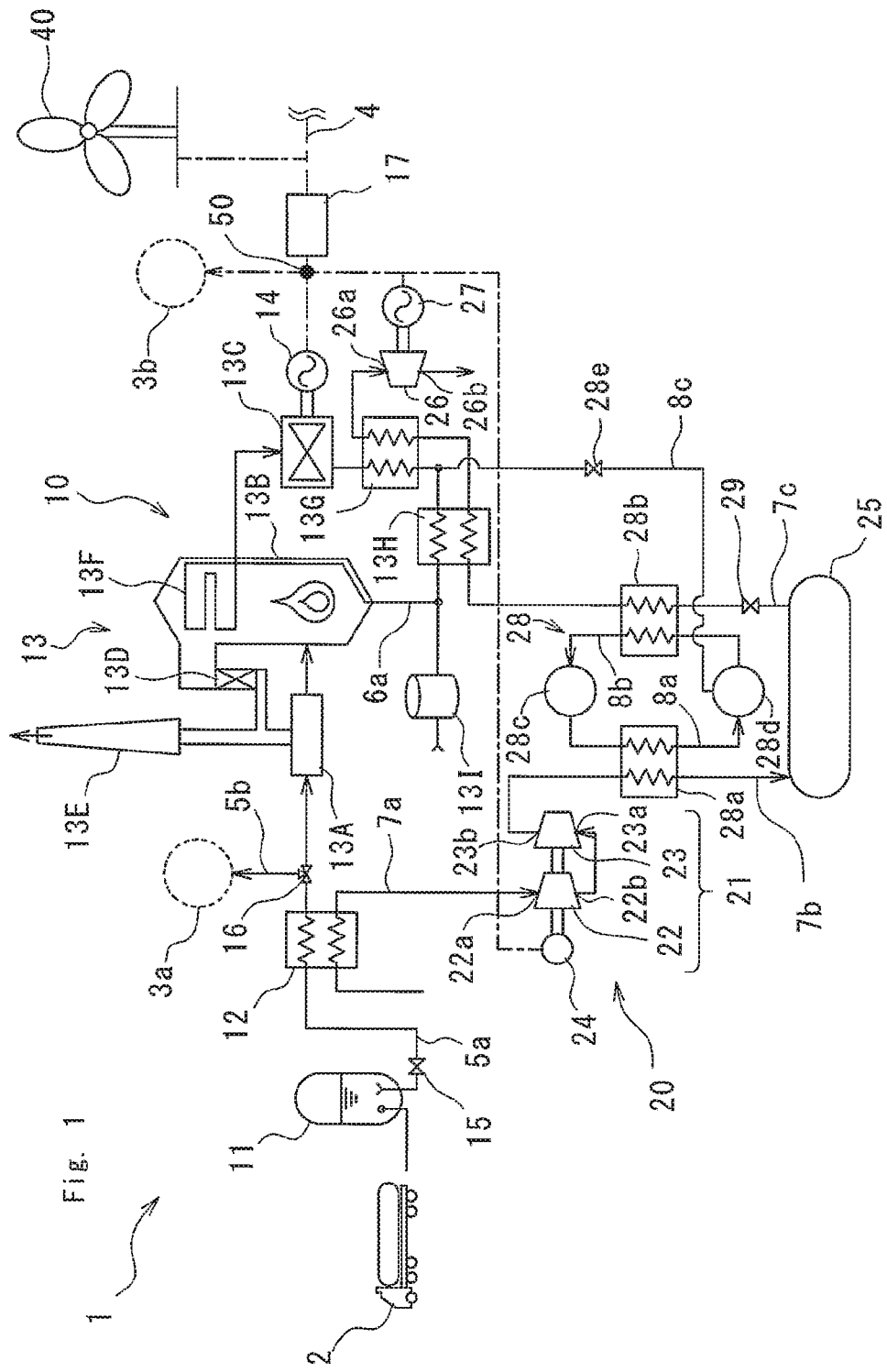
FIG. 1 is a schematic configuration diagram of a cold-heat power generation device according to a first embodiment of the present invention.

FIG. 1 is a schematic configuration diagram of a cold-heat power generation device 1 according to a first embodiment of the present invention. The cold-heat power generation device 1 includes a thermal power generation device 10 and a compressed air energy storage (CAES) power generation device 20. The cold-heat power generation device 1 of the present embodiment has a function of leveling the amount of power generated by a wind power generation device 40 to be described later.

The thermal power generation device 10 is a facility of a steam turbine type that burns liquefied natural gas (LNG) to drive a steam turbine for power generation. The thermal power generation device 10 includes an LNG storage tank 11, an LNG vaporizer 12, a motive power part 13, and a primary generator 14.

In the LNG storage tank 11 of the present embodiment, LNG transported, by a tank truck 2, from a port where an LNG receiving station is located is stored. The LNG thus stored has a temperature of, for example, −167° C. The LNG storage tank 11 is useful when installed at a satellite station constructed in an inland area or a non-urban factory area where natural gas (NG) cannot be transported by a pipeline. The LNG storage tank 11 is also useful when installed around the port where the LNG receiving station is located. The LNG storage tank 11 is connected to the motive power part 13 by a pipe 5a, and the LNG stored in the LNG storage tank 11 is supplied to the motive power part 13 through the pipe 5a. On the pipe 5a, a valve 15, the LNG vaporizer 12, and a three-way valve 16 are provided.

In the LNG vaporizer 12, heat is transferred between the LNG and air to heat and vaporize the LNG. The LNG vaporizer 12 is connected to a gas mixer 13A of the motive power part 13 by the pipe 5a. A pipe 5b branches from the pipe 5a via the three-way valve 16. The pipe 5b that branches is connected to a consumer facility 3a. Therefore, the natural gas vaporized by the LNG vaporizer 12 is fed to the gas mixer 13A of the motive power part 13 through the pipe 5a and is also supplied, after being adjusted in component, to the consumer facility 3a through the pipe 5b as a city gas. Further, the air cooled through a transfer of heat between the air and the natural gas in the LNG vaporizer 12 is supplied to an air compressor 21 to be described later.

In the present embodiment, the LNG vaporizer 12 of an air-heating type that heats LNG using air is used, or alternatively, a vaporizer of a water-heating type that heats LNG using seawater or groundwater may be used. When the vaporizer of a water-heating type is used, although details are not shown, a heat exchanger that transfers heat between air and cooling water flowing through the LNG vaporizer 12 is additionally provided, and the air cooled by the heat exchanger is supplied to the air compressor 21. Further, heat may be transferred between the natural gas and the air using nitrogen or the like as a medium without directly transferring heat. In any case, it is preferable to cool the air to a temperature within a cold resistance of the air compressor 21 (for example, about −50° C.)

The motive power part 13 is configured to generate motive power for driving the primary generator 14. The motive power part 13 includes the gas mixer 13A, a boiler 13B, and a steam turbine 13C.

In the gas mixer 13A, the natural gas fed from the LNG vaporizer 12 through the pipe 5a is mixed with exhaust gas discharged from the boiler 13B. The gas mixed in the gas mixer 13A is supplied to the boiler 13B and burned. The boiler 13B is provided with a denitrification device 13D, and the exhaust gas supplied from the boiler 13B to the gas mixer 13A is denitrified when flowing through the denitrification device 13D. Further, a stack 13E is provided adjacent to the boiler 13B, part of the exhaust gas denitrified by the denitrification device 13D is discharged from the stack 13E, and the rest of the exhaust gas is fed to the gas mixer 13A as described above. Further, a boiler pipe 13F is laid inside the boiler 13B and extends to the steam turbine 13C.

Water or steam flowing through the boiler pipe 13F is heated by the boiler 13B to become high-temperature steam of, for example, about 600° C. and supplied to the steam turbine 13C.

The steam is supplied to an inlet port of the steam turbine 13C through the boiler pipe 13F, and the steam turbine 13C is driven to rotate by the steam thus supplied. The steam turbine 13C is mechanically connected to the primary generator 14, and therefore the primary generator 14 is driven by the steam turbine 13C. The primary generator 14 is electrically connected to a power supply system 4 via a transformer 17, and power generated by the primary generator 14 is boosted in voltage by the transformer 17 and transmitted to the power supply system 4 of, for example, 6600 V. Further, the primary generator 14 is electrically connected to a consumer facility 3b such as an adjacent factory, and the power generated by the primary generator 14 is supplied to the consumer facility 3b as, for example, an in-house AC voltage of 440 V.

An outlet port of the steam turbine 13C is connected to the boiler pipe 13F via a pipe 6a, and the steam discharged from the steam turbine 13C is supplied to the boiler 13B. On the pipe 6a, a pre-cooler 13G and a condenser 13H are provided. The steam discharged from the steam turbine 13C is cooled by the pre-cooler 13G, and then further cooled by the condenser 13H to condense to liquid water. Accordingly, the liquid water is supplied to the boiler 13B and is heated by the boiler 13B as described above to become steam again. That is, liquid or gaseous water or steam circulates between the boiler 13B and the steam turbine 13C. Further, a pure water tank 13I is provided to prevent a shortage of water in the boiler 13B. The pure water tank 13I is connected to the boiler pipe 13F to allow the boiler pipe 13F to be replenished with pure water as needed. Note that the pre-cooler 13G and the condenser 13H act as heat exchangers that transfer heat from compressed air in a pipe 7c to be described later. Therefore, the pre-cooler 13G and the condenser 13H also act as air heaters that heats the compressed air to be supplied to an air expander 26 through the pipe 7c as described later.

The CAES power generation device 20 is provided adjacent to the thermal power generation device 10, and includes the air compressor 21, an air tank 25, the pre-cooler 13G and the condenser 13H serving as air heaters, the air expander 26, and a secondary generator 27.

The air compressor 21 of the present embodiment is a two-stage screw compressor and includes a first-stage compressor body 22 and a second-stage compressor body 23. The first-stage compressor body 22 and the second-stage compressor body 23 are both mechanically connected to a motor 24 and are driven by motive power from the motor 24. When driven, the first-stage compressor body 22 draws in air from an intake port 22a, compresses the air therein, and discharges the compressed air from a discharge port 22b to pressure-feed the compressed air to the second-stage compressor body 23. The second-stage compressor body 23 draws in, from an intake port 23a, the compressed air discharged from the first-stage compressor body 22, further compresses the compressed air therein, and discharges the compressed air from a discharge port 23b. Both of the first-stage compressor body 22 and the second-stage compressor body 23 of the present embodiment are of a screw type, but alternatively, may be of a reciprocating type or a turbo type. In particular, the second-stage compressor body 23 may be of a reciprocating type. This enables high compression to, for example, about 5 MPa. Further, a compressor of a screw type may be provided for up to the second stage, and a compressor of a reciprocating type may be provided for the third stage.

One end of a pipe 7a is connected to the intake port 22a of the first-stage compressor body 22, and the other end of the pipe 7a is open. Further, the LNG vaporizer 12 is provided on the pipe 7a. Therefore, the air drawn by the air compressor 21 corresponds to air cooled by the LNG vaporizer 12. At this time, the temperature of air to be drawn is, although depending on the cold resistance of the air compressor 21, about −50° C. as described above for example. Further, the discharge port 23b of the second-stage compressor body 23 is connected to the air tank 25 via the pipe 7b. Therefore, the compressed air discharged from the air compressor 21 is supplied to the air tank 25 through the pipe 7b. At this time, the temperature of the compressed air discharged from the discharge port 23b rises to, for example, about 100° C. because the temperature is increased by compression heat, and pressure of the compressed air becomes about 2 MPa.

A first heat exchanger 28a is provided on the pipe 7b, and the compressed air in the pipe 7b is cooled through a transfer of heat between the compressed air and a heating medium of a heating medium system 28 in the first heat exchanger 28a. In other words, in the first heat exchanger 28a, the heating medium of the heating medium system 28 is heated through a transfer of heat between the heating medium and the compressed air in the pipe 7b. Preferably, in the first heat exchanger 28a, the compressed air is cooled to about room temperature (atmospheric temperature). The details of the heating medium system 28 will be described later.

The air tank 25 stores the compressed air pressure-fed from the air compressor 21. The air tank 25 is connected to the inlet port 26a of the air expander 26 via the pipe 7c, and the compressed air stored in the air tank 25 is supplied to the air expander 26 through the pipe 7c. On the pipe 7c, a valve 29, a second heat exchanger 28b, the condenser 13H, and the pre-cooler 13G are provided. The valve 29 has a function of regulating a flow rate and thus can regulate the amount of air supplied from the air tank 25 to the air expander 26. Further, the compressed air in the pipe 7c is supplied to the air expander 26 after being heated by the second heat exchanger 28b, the condenser 13H, and the pre-cooler 13G. In particular, in the condenser 13H and the pre-cooler 13G, the compressed air is heated by heat generated when the natural gas is burned. At this time, the temperature of the compressed air supplied to the air expander 26 is, for example, about 150° C. As described above, heating the compressed air supplied to the air expander 26 makes it possible to increase expansion efficiency.

The air expander 26 is, for example, of a screw type and is driven by the compressed air supplied from the air tank 25. The air expander 26 is mechanically connected to the secondary generator 27, and the secondary generator 27 is driven by motive power from the air expander 26. The secondary generator 27 is electrically connected to the power supply system 1 via an output merging part 50 and the transformer 17, and the power generated by the secondary generator 27 is merged with the power generated by the primary generator 14. In the present embodiment, the output merging part 50 is merely a merging section of electric wiring, but may be a section having a mechanism such as a switch for switching between a power supply source and a power supply destination. Further, the air expanded by the air expander 26 is discharged from an outlet port 26b to the atmosphere. Note that the air expander 26 of the present embodiment is of a screw type that is quick in response to demand power to be described later, but alternatively, may be of a reciprocating type or a turbo type. Further, the air expander 26 of the present embodiment is of a single-stage type, but may be of a two or more-stage type.

The heating medium system 28 is provided to regulate the temperature of the compressed air in the CAES power generation device 20. The heating medium system 28 includes a low-temperature heating medium tank 28c, the first heat exchanger 28a, a high-temperature heating medium tank 28d, and the second heat exchanger 28b. These components are connected by pipes 8a, 8b. In the pipes 8a, 8b, the heating medium is circulated among the components by a pump (not shown). In the present embodiment, water is used as the heating medium, and the following description will be given with water serving as the heating medium; however, the heating medium is not limited to water, and may be any fluid such as oil. Further, a solid heat storage device such as ceramics may be used.

Low-temperature water is stored in the low-temperature heating medium tank 28c. The low-temperature heating medium tank 28c is replenished with water as needed and stores a required amount of water at all times. The pipe 8a extends from the low-temperature heating medium tank 28c to the high-temperature heating medium tank 28d so as to allow water serving as the heating medium to flow from the low-temperature heating medium tank 28c to the high-temperature heating medium tank 28d.

On the pipe 8a extending from the low-temperature heating medium tank 28c to the high-temperature heating medium tank 28d, the first heat exchanger 28a is provided. In the first heat exchanger 28a, the water in the pipe 8a is heated, and the compressed air in the pipe 7b is cooled.

The high-temperature heating medium tank 28d is a tank that stores high-temperature water heated by the first heat exchanger 28a. The high-temperature heating medium tank 28d is preferably insulated from the outside in order to maintain the temperature of the water stored therein. The pipe 8b extends from the high-temperature heating medium tank 28d to the low-temperature heating medium tank 28c so as to allow the water to flow from the high-temperature heating medium tank 28d to the low-temperature heating medium tank 28c. Further, a pipe 8c that branches from the pipe 6a connecting the pre-cooler 13G and the condenser 13H is connected to the high-temperature heating medium tank 28d. A valve 28e is provided on the pipe 8c, and the valve 28e is opened to allow the high-temperature heating medium tank 28d to be replenished with water serving as the heating medium. The valve 28e is closed to allow the flow of the water to be shut off.

On the pipe 8b extending from the high-temperature heating medium tank 28d to the low-temperature heating medium tank 28c, the second heat exchanger 28b is provided. In the second heat exchanger 28b, the water in the pipe 8b is cooled, and the compressed air in the pipe 7c is heated.

In the present embodiment, the wind power generation device 40 is electrically connected to the power supply system 4. Power generated by the wind power generation device 40 is constantly measured by a sensor (not shown). In general, the amount of power generated by the wind power generation device 40 varies in a manner that depends on the weather, and thus it is difficult to maintain the amount of power generated at a predetermined amount. Therefore, in order to maintain the amount of power generated at the predetermined amount, it is necessary to level the variable amount of power generated. On the other hand, the cold-heat power generation device 1 of the present embodiment is suitable for leveling the variable amount of power generated by the wind power generation device 40. Note that, in the present embodiment, the example has been described in which the cold-heat power generation device 1 is connected to the wind power generation device 40, but the cold-heat power generation device 1 may be connected to a different power generation device using renewable energy whose output is variable such as a photovoltaic power generation device or a solar thermal power generation.

Figure 2:
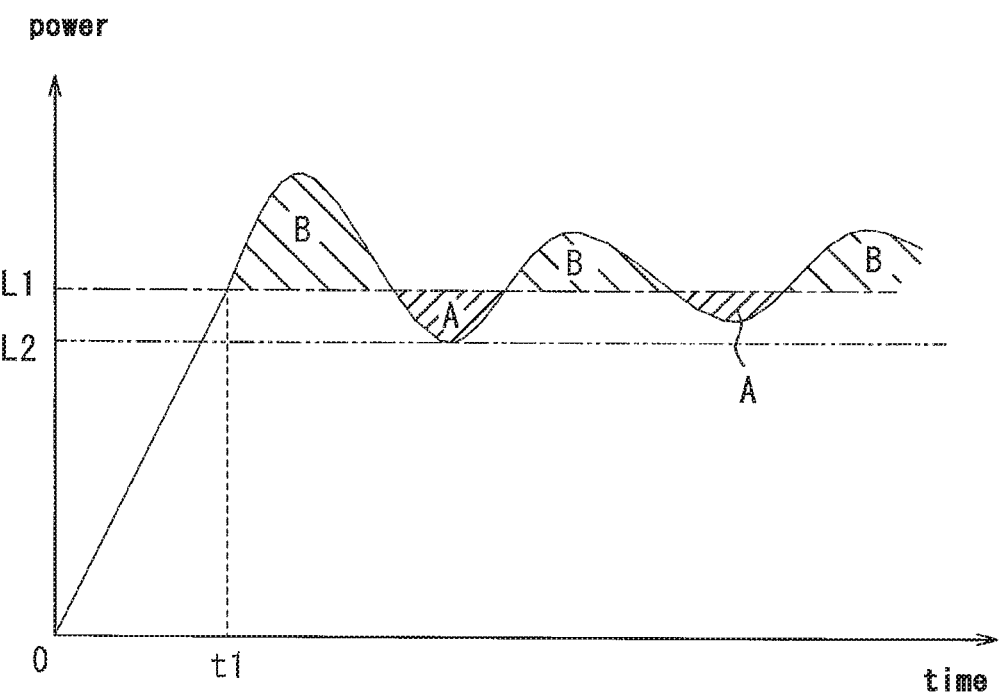
FIG. 2 is a graph showing leveling of the amount of power generated by a wind power generation device.

FIG. 2 is a graph showing a concept of the leveling. A horizontal axis represents time, and a vertical axis represents power. A long dashed short dashed line L1 represents power (demand power) required from a consumer facility such as a factory, and the demand power is represented by a horizontal line as a constant value in FIG. 2 for the sake of simplicity of the description. However, the actual demand power is not constant, and may vary with time. Further, a long dashed double-short dashed line L2 represents the amount of power generated by the primary generator 14 of the thermal power generation device 10. The amount of power generated by the primary generator 14 of the present embodiment is represented by a horizontal line as a constant value corresponding to the maximum output of the primary generator 14. A curve waving above the long dashed double-short dashed line represents the amount of power generated by the wind power generation device 40 added to the amount of power generated by the primary generator 14 of the thermal power generation device 10. As described above, the amount of power generated by the wind power generation device 40 varies in a manner that depends on the weather, and thus is represented by a wavy curve as shown in FIG. 2. In the example shown in FIG. 2, when the amount of power generated by the wind power generation device 40 becomes less than a certain amount, the amount of power generated equivalent to the amount of demand power cannot be secured, and as a result, a power shortage occurs (see a hatched area A in FIG. 2). On the other hand, when the amount of power generated by the wind power generation device 40 becomes equal to or greater than the certain amount, the amount of power generated exceeds the amount of demand power, and surplus power is generated (see a hatched area B in FIG. 2).

In the present embodiment, the secondary generator 27 generates power to compensate for the power shortage and supplies the surplus power to the motor 24 to produce compressed air, thereby allowing the use of energy without waste. Further, in order to use energy without waste, power generated by the primary generator 14 and the secondary generator 27 may be supplied to the motor 24 as needed. Further, time t1 in FIG. 2 denotes a start-up time of the CAES power generation device 20. The start-up time t1 of the CAES power generation device 20 having, for example, ten and several seconds is shorter than a start-up time of the thermal power generation device 10 (for example, about 30 minutes). Therefore, it is possible to quickly respond to the demand power even at the start-up.

Further, when the amount of power generated by the wind power generation device 40 is much greater than the demand power, the primary generator 14 of the thermal power generation device 10 is brought to a stop, and the output of the wind power generation device 40 may be smoothed by the CAES power generation device 20 and then supplied to a consumer. This makes it possible to reduce LNG consumption of the thermal power generation device 10. In this case, the compressed air before being supplied to the air expander 26 is preheated by high-temperature heating medium stored in the high-temperature heating medium tank 28d. Further, heat generated by the thermal power generation device 10 may be stored in a heat storage device (not shown), and the preheating may be done using the heat thus stored.

The cold-heat power generation device 1 of the present embodiment has the following advantages.

Since the LNG vaporizer 12 cools air using cold generated when the LNG is vaporized and supplies the air thus cooled to the air compressor 21, it is possible to increase the density of the compressed air and thereby increase the compression efficiency of the air compressor 21. Further, since the compressed air is heated by the air heater (the pre-cooler 13G and the condenser 13H) with heat generated when the natural gas is burned in the boiler 13B, and the compressed air thus heated is expanded by the air expander 26, it is possible to increase the expansion efficiency of the air expander 26, that is, to increase the power generation efficiency of the secondary generator 27.

Furthermore, making the power output of the secondary generator 27 variable allows the amount of power generated to quickly respond to the amount of demand power, which eliminates the need of making the power output of the primary generator 14 variable. Therefore, the primary generator 14 can continuously generate power at the maximum output, so that it is possible to increase the power generation efficiency.

Further, since a large amount of stable power output of the primary generator 14 of the thermal power generation device 10 and highly responsive power output of the secondary generator 27 of the CAES power generation device 20 can be merged with each other at the output merging part 50, it is possible to produce a larger amount of stable power output and highly responsive power output.

The temperature of the compressed air stored in the air tank 25 can be reduced by the first heat exchanger 28a and can preferably be substantially regulated to room temperature. This makes it possible to reduce the amount of heat radiated, to the atmosphere, from the compressed air stored in the air tank 25, so that it is possible to increase the energy efficiency of the cold-heat power generation device 1. Further, the high-temperature heating medium heated by the first heat exchanger 28a can be stored in the high-temperature heating medium tank 28d, the high-temperature heating medium in the high-temperature heating medium tank 28d can be supplied to the second heat exchanger 28b as needed to heat the compressed air in the heat exchanger 28b, and the compressed air thus heated can be supplied to the air expander 26, so that it is possible to increase the expansion efficiency of the air expander 26.

Figure 3:
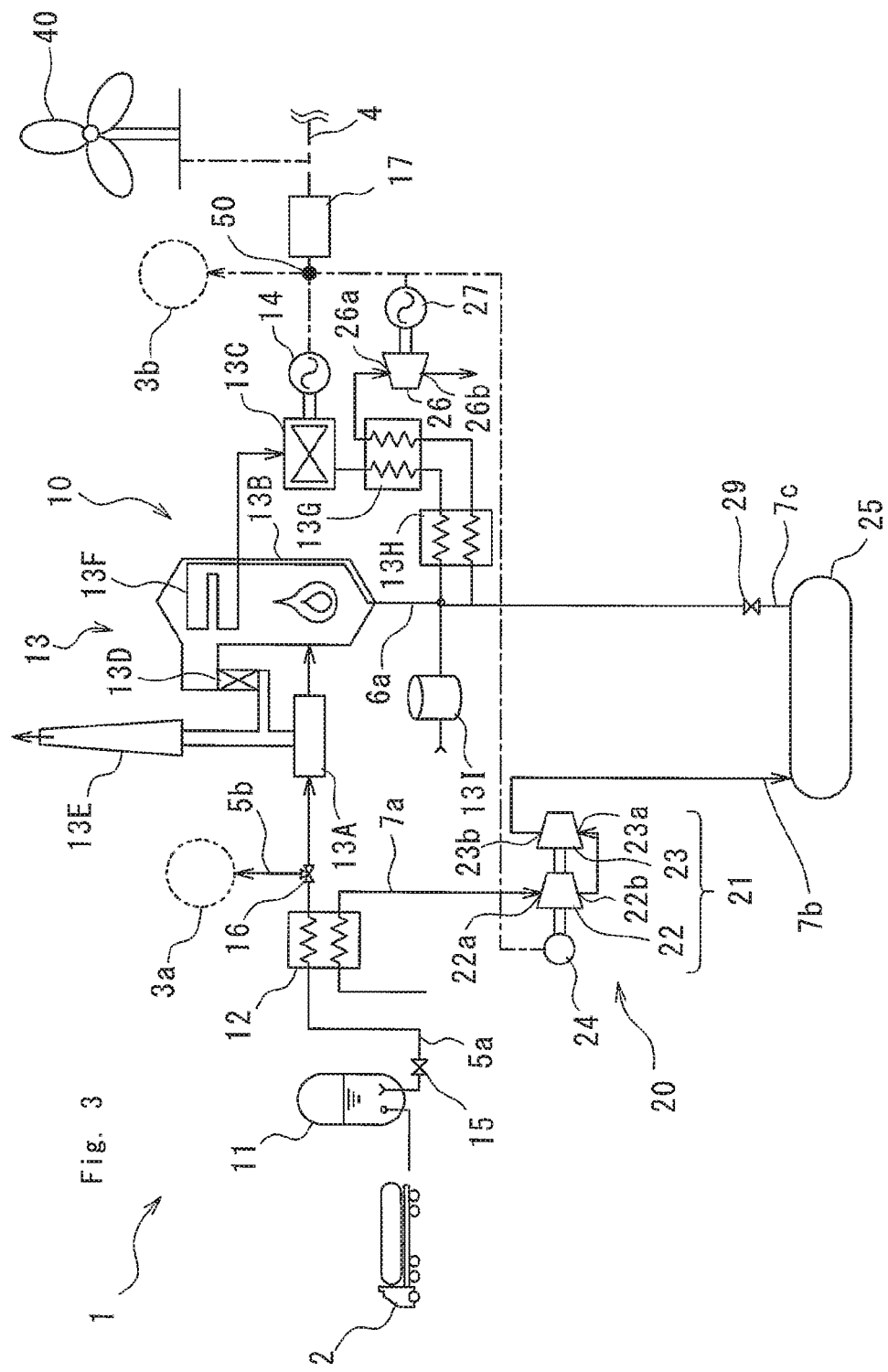
FIG. 3 is a schematic configuration diagram of a modification of the cold-heat power generation device shown in FIG. 1.

As shown in FIG. 3 as a modification of the first embodiment, the CAES power generation device 20 need not include the heating medium system 28 (see FIG. 1). The heating medium system 28 (see FIG. 1) is provided to regulate the temperature of the compressed air in the CAES power generation device 20 to increase the energy efficiency. Therefore, the heating medium system 28 (see FIG. 1) is not an essential component in terms of its functionality. The same applies to the following embodiments. Furthermore, when air drawn into the compressor 21 is cooled to, for example, about −150° C., the compressed air discharged from the discharge port 23b may have room temperature or about 50° C. In this case, the amount of heat radiated from the compressed air in the air tank 25 to the atmosphere is small. This reduces the necessity of cooling the compressed air in the first heat exchanger 28a, which may eliminate the need of the first heat exchanger 28a.

Second Embodiment

Figure 4:
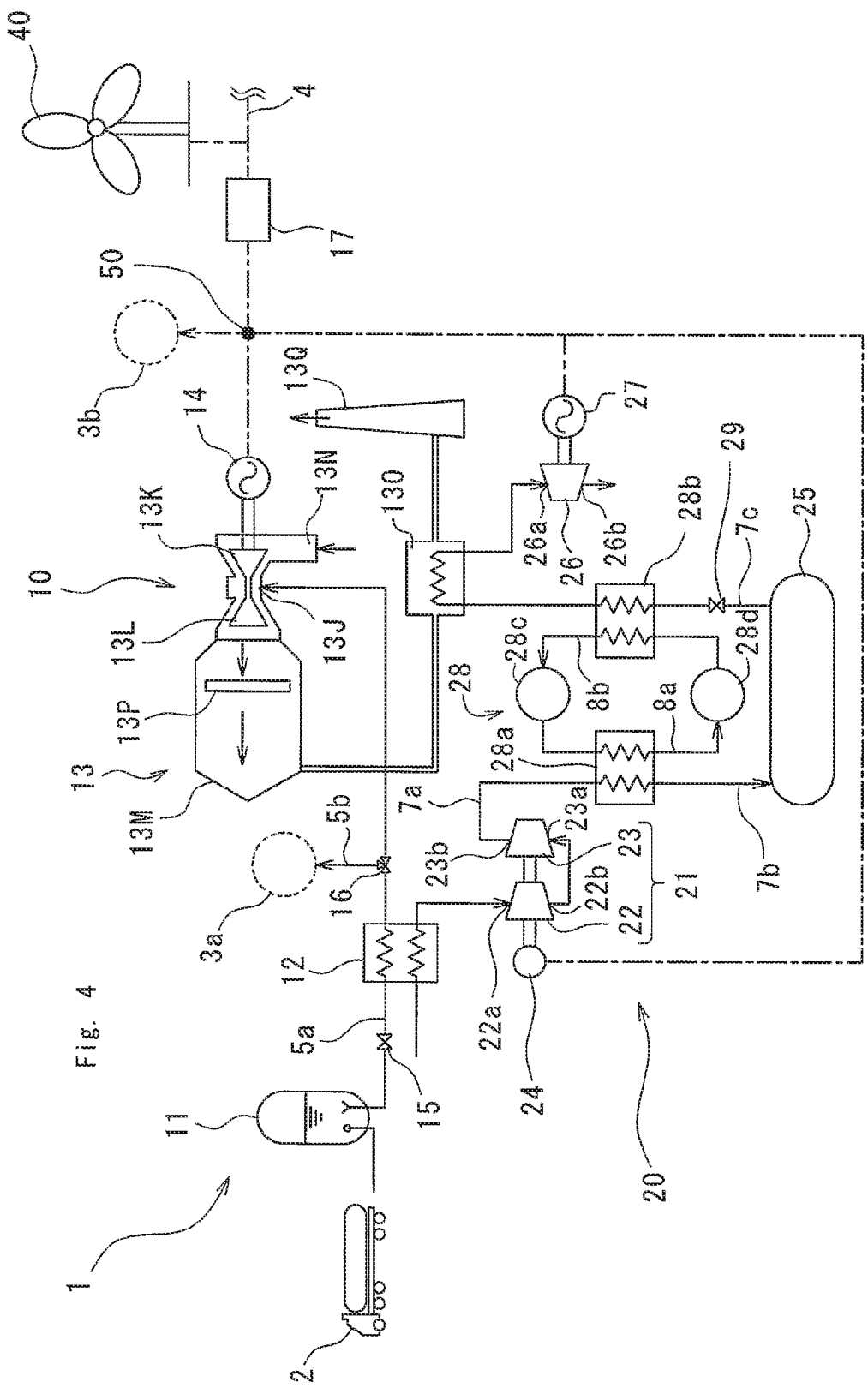
FIG. 4 is a schematic configuration diagram of a cold-heat power generation device according to a second embodiment.

In a cold-heat power generation device 1 of a second embodiment shown in FIG. 4, the motive power part 13 of the thermal power generation device 10 is of a gas turbine type. The other configuration is the same as the configuration of the cold-heat power generation device 1 of the first embodiment shown in FIG. 1. Therefore, the same components as the components of the configuration shown in FIG. 1 are denoted by the same reference numerals, and the description of the components will be omitted.

The motive power part 13 of the present embodiment includes a combustor 13J, an air compressor 13K, a gas turbine 13L, and an exhaust heat recovery boiler 13M.

The combustor 13J is connected to the LNG vaporizer 12 by the pipe 5a, and natural gas vaporized by the LNG vaporizer 12 is fed to the combustor 13J through the pipe 5a. Further, the combustor 13J is in fluid communication with the air compressor 13K and the gas turbine 13L. In the combustor 13J, the natural gas fed from the LNG vaporizer 12 through the pipe 5a and compressed air drawn in from an intake port 13N and compressed by the air compressor 13K are mixed and burned to produce high-temperature combustion gas. Then, the gas turbine 13L is driven by the combustion gas. The gas turbine 13L is mechanically connected to the primary generator 14, and the primary generator 14 is driven by the gas turbine 13L.

The gas turbine 13L is provided with the exhaust heat recovery boiler 13M, and the combustion gas supplied to drive the gas turbine 13L recovered by the exhaust heat recovery boiler 13M. A denitrification device 13P is provided in the exhaust heat recovery boiler 13M, and the combustion gas discharged is denitrified when flowing through the denitrification device 13P. Further, the exhaust heat recovery boiler 13M is provided with an air heater 13O and a stack 13Q, and high-temperature exhaust gas discharged through the exhaust heat recovery boiler 13M is subjected to heat recovery through the air heater 13O and then discharged from the stack 13Q. In the air heater 13O, compressed air in the pipe 7c is heated by the heat recovered from the exhaust gas, and the temperature of the compressed air to be supplied to the air expander 26 is increased. In the present embodiment, the compressed air supplied to the air expander 26 is heated by the air heater 13O, for example, to about 150° C.

Advantages obtained by the cold-heat power generation device 1 of the present embodiment are substantially the same as the advantages of the first embodiment.

Third Embodiment

Figure 5:
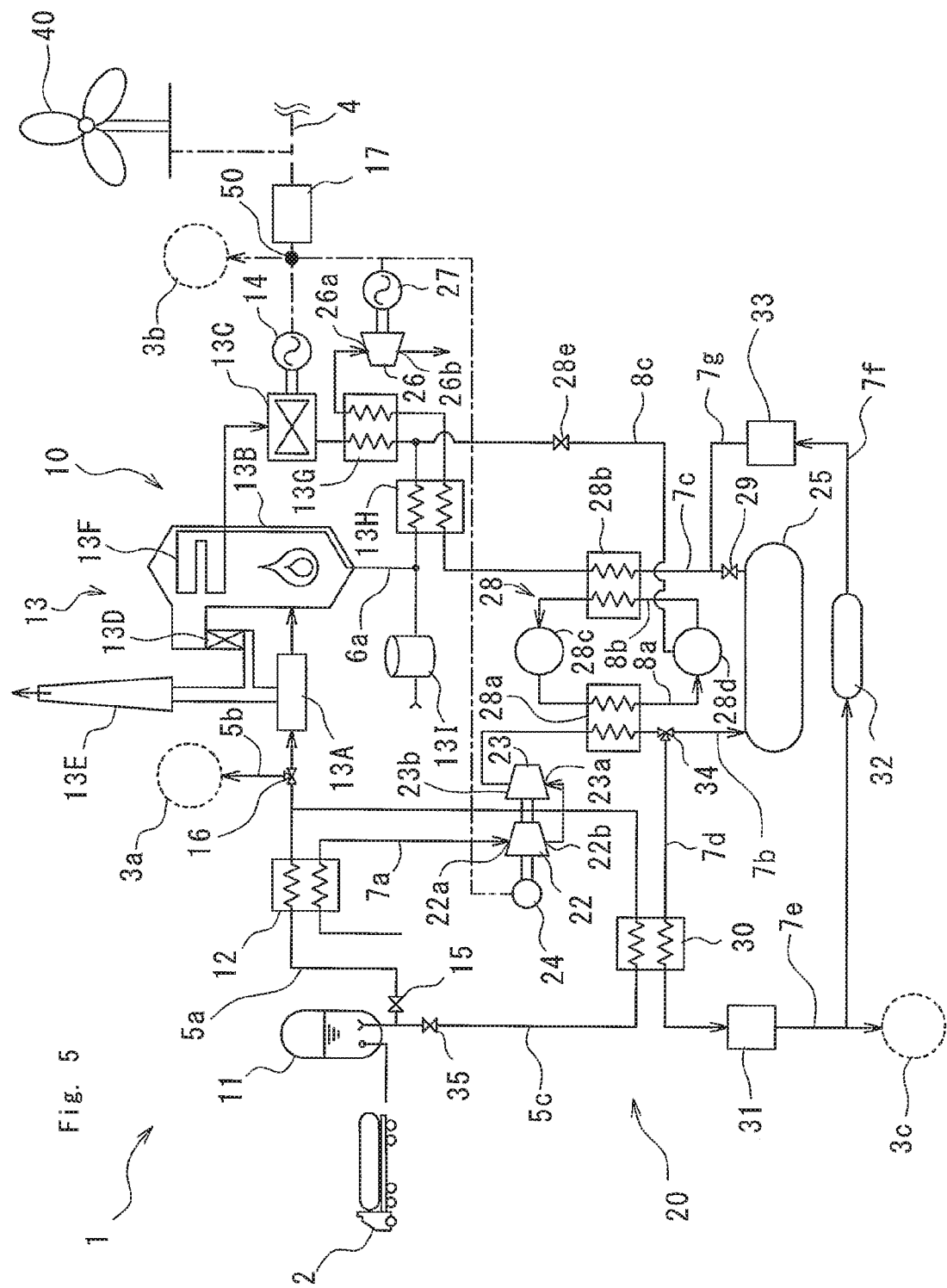
FIG. 5 is a schematic configuration diagram of a cold-heat power generation device according to a third embodiment.

A cold-heat power generation device 1 of the third embodiment shown in FIG. 5 has a function of producing and storing liquid air. The other configuration is the same as the configuration of the cold-heat power generation device 1 of the first embodiment shown in FIG. 1. Therefore, the same components as the components of the configuration shown in FIG. 1 are denoted by the same reference numerals, and the description of the components will be omitted.

A CAES power generation device 20 of the present embodiment includes an air cooler 30, an air liquefier 31, a liquid air tank 32, and an air vaporizer 33 in addition to the configuration of the first embodiment. The air cooler 30, the air liquefier 31, the liquid air tank 32, and the air vaporizer 33 are connected via pipes 7d to 7g, and liquid or gaseous air flows through the pipes 7d to 7g.

In the air cooler 30, heat is transferred between LNG in a pipe 5c that extends from the LNG storage tank 11 toward the gas mixer 13A and on which a valve 35 is provided, and compressed air in the pipe 7d that branches, via a three-way valve 34, from the pipe 7b extending from the first heat exchanger 28a to the air tank 25, and extends to the air liquefier 31. Specifically, in the air cooler 30, the LNG is heated, and the compressed air is cooled. Herein, the LNG thus heated is vaporized and fed to the gas mixer 13A, and the compressed air thus cooled is fed to the air liquefier 31 through the pipe 7d.

The air liquefier 31 further reduces the temperature by adiabatically expanding the compressed air cooled by the air cooler 30 to liquefy the compressed air. The air liquefier 31 is connected to the liquid air tank 32 by the pipe 7e, and the liquid air liquefied by the air liquefier 31 is fed to the liquid air tank 32 through the pipe 7e.

The liquid air tank 32 is a tank that stores liquid air. Since the liquid air tank 32 stores air in a liquid state, a large amount of air can be stored by reducing the volume of the air as compared to the capacity of the air tank 25 that stores air in a gas state. The liquid air tank 32 is connected to the air vaporizer 33 by the pipe 7f, and the liquid air stored in the liquid air tank 32 is fed to the air vaporizer 33 through the pipe 7f. Note that an air separation device (not shown) may be provided on the flow path of the liquefied air liquefied by the air liquefier 31 as needed, thereby allowing a commercially useful component (e.g., argon gas) out of air components from the liquefied air to be separated and fed to a consumer facility 3c.

The air vaporizer 33 has a function of vaporizing liquid air. The air vaporizer 33 is not limited to any specific mode, and may be, for example, of an air-heating type that heats liquid air using the atmosphere. The air vaporizer 33 is connected to the pipe 7c via the pipe 7g. That is, the air vaporized by the air vaporizer 33 is drawn into the air expander 26 together with the compressed air from the air tank 25.

According to the present embodiment, liquefying air allows a large amount of air to be stored in the liquid air tank 32. This allows air to be supplied to the air expander 26 for a long time and allows power to be generated by the secondary generator 27 for a long time accordingly. Therefore, the output of the primary generator 14 can be supplemented for a long time. Further, in the air cooler 30, before the air is liquefied, it is possible to reduce energy used for liquefying the air by cooling the air using cold generated when the LNG is vaporized.

As described above, although the description has been given of the specific embodiments and modifications of the embodiments according to the present invention, the present invention is not limited to such embodiments and may be variously modified and implemented within the scope of the present invention. For example, a suitable combination of the respective contents of the embodiments may be implemented as an embodiment of the present invention. In the above embodiments, the cold-heat power generation device 1 is used for leveling the amount of power generated by the wind power generation device 40, but the cold-heat power generation device 1 is applicable to not only the above use but also any uses that require a quick response to demand power. For example, the cold-heat power generation device 1 is further applicable to other uses such as leveling other renewable energies or securing power at factories or the like that require a right amount of power at a right time.

The invention claimed is:

1. A cold-heat power generation device comprising:
a thermal power generation device;
a compressed air energy storage power generation device; and
an output merging part,
wherein the thermal power generation device includes:
an LNG vaporizer that vaporizes liquefied natural gas;
a motive power part that burns natural gas vaporized by the LNG vaporizer to convert the natural gas into motive power; and
a primary generator that is driven by the motive power produced by the motive power part,
wherein the compressed air energy storage power generation device includes:
an air compressor that compresses air cooled by cold generated when the liquefied natural gas is vaporized by the LNG vaporizer to a compressed gaseous state;
an air tank that stores compressed air discharged from the air compressor in the compressed gaseous state;
an air heater that heats the compressed air in the compressed gaseous state supplied from the air tank with heat generated when the natural gas is burned in the motive power part;
an air expander that expands the compressed air heated by the air heater; and
a secondary generator that is driven by the air expander, and
wherein output of the primary generator and output of the secondary generator are merged with each other at the output merging part.

2. The cold-heat power generation device according to claim 1, wherein
the compressed air energy storage power generation device further includes:
a first heat exchanger that transfers heat between the compressed air discharged from the air compressor and a heating medium to heat the heating medium;
a high-temperature heating medium tank that stores the heating medium heated by the first heat exchanger; and
a second heat exchanger that transfers heat between the heating medium stored in the high-temperature heating medium tank and the compressed air supplied from the air tank to the air expander to heat the compressed air.

3. The cold-heat power generation device according to claim 1, wherein
the compressed air energy storage power generation device further includes:
an air cooler that cools the compressed air by cold generated when the liquefied natural gas is vaporized;
an air liquefier that expands the compressed air cooled by the air cooler to liquefy the compressed air;
a liquid air tank that stores liquid air liquefied by the air liquefier; and
an air vaporizer that vaporizes the liquid air stored in the liquid air tank and supplies the air vaporized to the air expander.

4. The cold-heat power generation device according to claim 2, wherein
the compressed air energy storage power generation device further includes:
an air cooler that cools the compressed air by cold generated when the liquefied natural gas is vaporized;
an air liquefier that expands the compressed air cooled by the air cooler to liquefy the compressed air;
a liquid air tank that stores liquid air liquefied by the air liquefier; and
an air vaporizer that vaporizes the liquid air stored in the liquid air tank and supplies the air vaporized to the air expander.

* * * * *